United States Patent [19]

Steilen et al.

[11] 4,207,823
[45] Jun. 17, 1980

[54] PLANTER

[75] Inventors: Ronald M. Steilen, Ankeny; Steve A. Junge, Des Moines, both of Iowa

[73] Assignee: Deere & Company, Moline, Ill.

[21] Appl. No.: 912,554

[22] Filed: Jun. 5, 1978

[51] Int. Cl.² .............................................. A01C 5/06
[52] U.S. Cl. ........................................ 111/85; 111/88; 172/538; 172/560; 172/575
[58] Field of Search ........................ 111/66, 85, 86, 87, 111/88; 172/536, 558, 559, 574, 575, 560, 538

[56] References Cited

U.S. PATENT DOCUMENTS

| | | | |
|---|---|---|---|
| 410,438 | 9/1889 | Patric et al. | 111/85 X |
| 1,286,268 | 12/1918 | Fifield | 172/575 |
| 2,155,443 | 4/1939 | Parks et al. | 111/85 |
| 2,332,012 | 10/1943 | Rasmussen | 172/536 |
| 2,577,775 | 12/1951 | Lemmon et al. | 111/85 |
| 2,685,243 | 8/1954 | Cole | 172/574 |
| 3,499,495 | 3/1970 | Pust | 172/536 |
| 4,009,668 | 3/1977 | Brass et al. | 172/559 |
| 4,044,697 | 8/1977 | Swanson | 111/66 |

*Primary Examiner*—Paul T. Sewell
*Assistant Examiner*—James R. Feyrer

[57] ABSTRACT

A compact agricultural planter unit is provided for narrow row crops. The unit includes a pair of double disk furrow openers in combination with adjustable depth gauge wheels. The disks and wheels are carried by frame structure positioned between the wheels and are rotatably mounted on pivots located radially inwardly of the wheel peripheries. Manually adjustable structure for selecting the furrow depth or position of the gauge wheels relative to the disks extends slightly radially outwardly beyond the wheels.

16 Claims, 4 Drawing Figures

PLANTER

BACKGROUND OF THE INVENTION

The present invention relates generally to agricultural planters and more specifically to a furrow depth control structure provided for grain drill planting units.

Available furrow depth control structures utilized on narrow row planting implements provide neither accurate gauging nor simple and easy adjustment of the furrow depth.

Accurate seed placement has long been recognized as one important factor in achieving maximum seed germination and early plant emergence. Unless the seed is planted at the depth where moisture is available, germination will not occur without rain or irrigation. Since the depth at which moisture can be found will vary with geographical location, soil type, soil condition and recent weather conditions, accurate furrow depth control and simple and easy adjustment of that control mechanism is required to realize maximum seed germination and early plant emergence.

Improved furrow formation and accurate depth control has recently been provided in the furrow-forming arrangement subject of U.S. Pat. No. 3,499,495 issued Mar. 10, 1970 to W. H. Pust. The Pust structure has further been adapted for commercial use and provided with a quick and simple depth adjusting structure in the Max-Emerge planter manufactured by Deere & Company and subject of U.S. Pat. No. 4,009,668 issued Mar. 1, 1977 to Brass et al. While the Max-Emerge planter has provided depth control for crops planted in widely spaced rows, such control is not available for crops such as soybeans, peas and edible beans which are planted in narrow rows and often utilize a grain drill.

Planter unit width is obviously restricted when narrow row crops are planted, and accordingly depth bands have commonly been provided to control the furrow depth.

While depth band structures provide reasonable depth control in some planting conditions, they fail to work when surface soil is moist since the soil adheres to the bands. Further, the bands fail to provide cleanly cut, well formed and firmed furrows typically formed with the structure available in the Deere Max-Emerge planter. Since the depth bands are generally mounted coaxially with the axes of the disk openers and secured to the disks, the time and effort to substitute bands in order to change the furrow depth can be substantial.

SUMMARY OF THE INVENTION

To overcome these problems there is provided herein a compact disk opener and gauge wheel unit including structure for simply and quickly adjusting the depth of the furrow to be formed by a narrow row planting unit.

To minimize the width of the furrow-forming unit, the disk supporting frame, seed tube and gauge wheel support structure are all positioned between the planes within which the disk opener blade rotate. To further assure compactness of the unit, the narrow profile gauge wheel is mounted adjacent each disk on its outside similar to that mounting found in the patent issued to Pust. Further, the arms which rotatably support the gauge wheels are positioned between the hubs of the gauge wheels and their respective disk openers and radially inwardly of the outer periphery of the gauge wheel.

To provide for simple and easy adjustment of the gauge wheels utilized in the furrow opening unit, a manually adjustable structure is provided between the gauge wheel support arms and projects slightly radially outwardly beyond the periphery of the gauge wheels to permit the operator to quickly change the gauge wheel position.

DESCRIPTION OF THE PREFERRED EMBODIMENT

Figure 1:
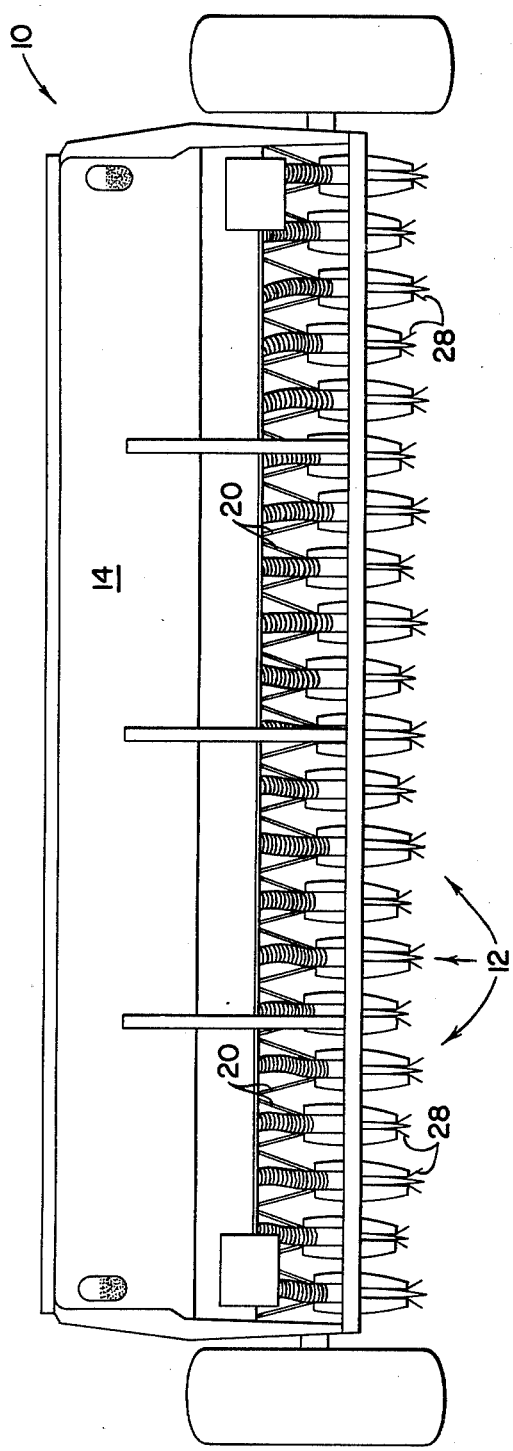
FIG. 1 is a rear view of a grain drill utilizing the present invention.

Referring now to FIG. 1, there is illustrated a grain drill 10 utilizing the compact and adjustable narrow row planting unit. 12 of the present invention. The drill 10 includes a plurality of fore-and-aft, staggered and transversely aligned evenly spaced planting units 12 carried beneath the transversely extending grain storage box 14.

Figure 2:
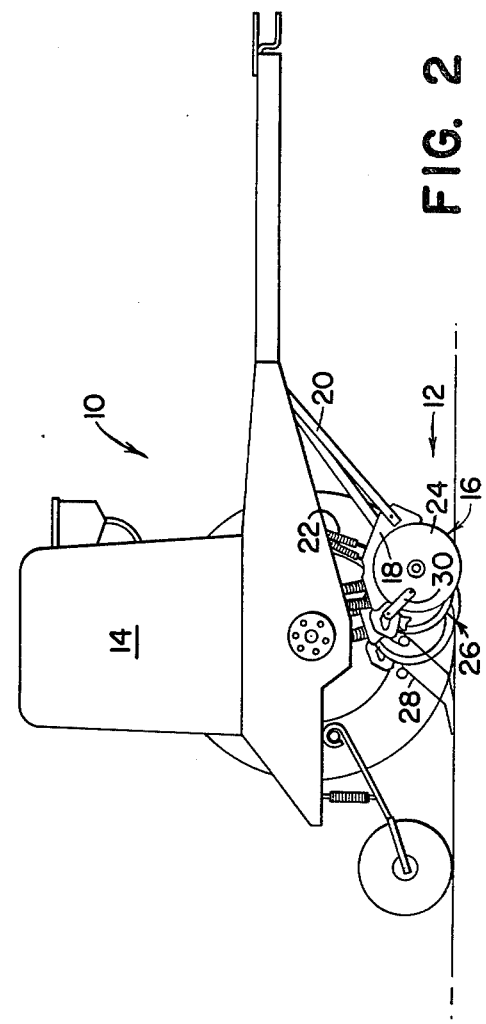
FIG. 2 is a side view of a grain drill illustrated in FIG. 1 with the gauge wheel removed from the first unit and closing wheels added to the rear of the unit.
Figures 3, 4:
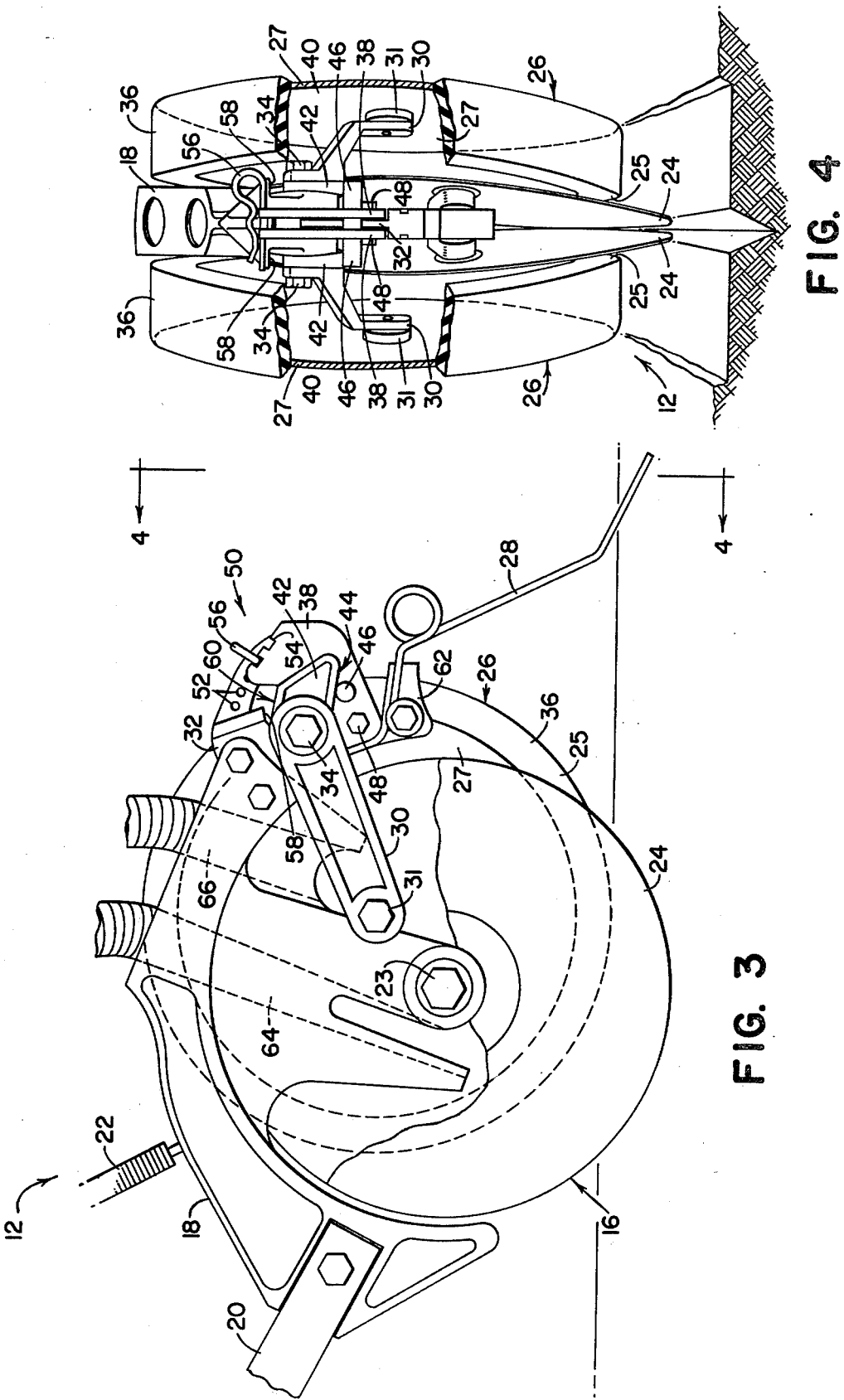
FIG. 3 is an expanded and side view of the furrow opening unit.
FIG. 4 is a rear elevational view of the furrow opening unit illustrated in FIG. 3 with the closing tines omitted.

Looking now to FIGS. 2 and 3, which illustrate the planting unit 12 in a side view, there is seen the double disk furrow opener 16 carried by a disk and wheel supporting carrier frame 18 which in turn is pulled by a towbar 20. Each towbar 20 is pivotally connected to the grain drill 10 and each frame 18 and its furrow opener 16 is urged downwardly by the compression spring 22 mounted between it and the chasis of the grain drill 10.

Rearwardly of each disk blade 24 is a depth gauge and furrow forming wheel 26 rotatably mounted to be in substantial face contact with the outer surface of the blade 24. Each wheel is composed of a transversely extending outer rim 25 and a radially extending wall 27 spaced outwardly of the adjacent disk 24. The wheels 26 have, therefore, inwardly opening cavities and the inner edges of rims 25 contact and scrape the surfaces of the respective disks 24. To the rear of the gauge wheels 26 and in trailing relation to the disk blades 24 is carried a pair of furrow closing tines 28. It should be realized, however, that many other furrow closing devices could be used in conjunction with the described planting structure. For example, a conventional press wheel could be used in trailing relation to the furrow opening structure when drier soil conditions exist.

The ground engaging furrow forming disk blades 24 are supported from the frame 18 for rotation about generally horizontal and intersecting axis. The axes are inclined slightly so as to provide for the disk peripheries to substantially contact one another at their forward lower quadrant and generally at their point of entry into the ground. The disks diverge upwardly and rearwardly relative to the direction of travel so that their edges at their upper rear quandrant are spaced comparatively further apart. The vertical planes within which each disk rotates similarly diverge upwardly and rearwardly.

The depth gauge wheels 26 are rotatably mounted on axes spaced rearwardly of the disk axes with each wheel axis generally parallel to a respective disk axis to assure general face contact between the inner surface of the wheel 26 and the outer surface of the disk blade 24. Since the axes of the disk blade 24 and its respective wheel 26 are offset, there is relative motion between the disk 24 and the wheel 26 at their contacting surfaces. This contact provides a scrubbing action on the disk blade 24 to assure continual cleaning of the outer surface of the disk blade 24 during operation. The rear edges of the disks 24 are spaced forward of the rear portions of the rims 25 and provide gaps therebetween.

As may be seen from viewing FIG. 3, the carrier frame 18 extends fore-and-aft and has a forward portion connected to the drawbar. The frame 18 extends over the disks 24 and has an arcuate underside conforming in shape generally to the peripheral upper edges of the disks. A central portion depends from the frame 18 between the disks and carries the axle structure 23 of the disks.

To firm the furrow walls during furrow formation, each wheel 26 is positioned slightly behind its respective disk blade 24 so as to contact the ground approximately at the area where its respective disk blade 24 exits the ground while the angled disk blades 24 are wedging through the soil. The wheel 26 thus holds the furrow wall soil in place as the disks 24 exit to prevent the soil from being thrown outwardly and rearwardly. The wheel 26 performs the functions of cleaning the disk surface, gauging furrow depth, supporting the frame 18 and planting unit 12 and holding the soil down at the disk exit area to provide a well formed and uncollapsed furrow wall.

Gauge wheels 26 are rotatably carried on a U-shaped wheelsupporting arm structure composed of an upper horizontal bight portion extending transversely between the wheels and through the gaps between the rear disk edges and wheel rim portions 25, and a pair of forwardly extending depending arms 30 having their lower ends carrying the axle structures 31 of the respective wheels 26. As is shown in FIG. 4, the major portions of arms 30 are disposed in the wheel cavities. Each support arm 30 is pivotally mounted on a support structure 32 carried on the frame 18 rearwardly of the disk axis and between the planes within which the disk blades 24 rotate. The support structure is a rear portion or extension of the carrier 18 lying rearwardly outboard of the upper rear quadrant of the disks 24. The pivotal support 34 of each arm 30 is contained between the disk planes and within the area circumscribed by the wheel periphery 36 so as to provide a compact and narrow planting unit 12. Further carried by the support structure 32 between the planes in which the disk blades 24 rotate is an adjustable stop bracket 38 for varying the position of the gauge wheels 26 with respect to the disk blades 24 and therefore the furrow depth.

Looking now to FIG. 3, it can be seen that one support arm 30 extends forwardly and downwardly between the outer surface of a respective disk blade 24 and gauge wheel hub 40. As best shown in FIG. 4, each arm 30 includes a neck 42 extending rearwardly of the pivotal connection 34 between the arm 30 and the support structure 32. It is the lower surface 44 of this neck 42 which abuts against a transversely projecting stop pin 46 carried beneath it and on the stop bracket 38. This limits the clockwise swinging movement of the arm 30 and therefore controls the depth to which the disk blades 24 can penetrate beneath the gauge wheels 26. The stop bracket 38 is carried between the arms 30 and is pivotally mounted at 48 to the support structure 32.

The transversely projecting pin 46 is carried on the bracket 38 for swinging movement about the pivotal connection 48 through a generally vertical arc to vertically vary the point at which the neck 42 and its abutment surface 44 engage the pin 46. As the pin 46 is adjusted downwardly, the neck 42 can swing clockwise further about its pivot 34 and the arm 30 and its wheel 26 will raise to permit the disk blades 24 to further penetrate the ground.

A quick adjusting locking means 50 is provided between the support structure 32 and the stop bracket 38. The locking means 50 projects radially outwardly beyond the gauge wheel periphery 36 to provide easy access for the operator while the remaining supporting structure for the wheels 26 and disk 24 is carried in the recessed arrangement described hereinabove. The locking means 50 includes a series of horizontal holes 52 through the support structure 32 and a pair of slots 54 through the bracket 38 alignable with the openings 52. A cotter pin 56 or similar device can be easily inserted through any aligned slot 54 and opening 52 to secure the bracket 38 and stop pin 46 where desired so as to provide for a particular furrow depth.

Looking again to FIGS. 3 and 4, a nonadjustable stop surface 58 against which the upper surface 60 of each neck 42 abuts to limit the counterclockwise or downwardly swinging movement of the arm 30 is carried above the pivotal connection 34 and between each arm 30 and the support structure 32. As the arms 30 swing counterclockwise, the upper surface 60 of the neck 42 abuts the stop 58 to prevent downwardly swinging movement of the gauge wheel 26. This stop surface 58 maintains the gauge wheels 26 in a raised position during transport and limits swinging movement of the gauge wheels 26 as the planting unit 12 drops into a hole or other depression during operation. As can be seen from FIGS. 3 and 4, each wheel 26 and arm 30 is independently vertically swingable so as to be able to follow the ground contours directly beneath it.

Also carried on the rearwardly end of the support structure 32 and between the planes of the disks is a mount 62 for the closing tines 28. Since the furrow formed by this disk bladegauge wheel combination is firm and well formed and since the seed is exposed after it has been deposited into the furrow, there must be provided some means to close the furrow over the seed. The closing tines 28 normally are in pairs and are mounted so that one is on each side of but close to the furrow. Each tine 28 trails rearwardly and downwardly of the opening structure and slices through the soil adjacent the furrow exerting a force that collapses the furrow wall over the seed. When the soil is extremely dry, a press wheel may be desired in order to assure that the dry soil is firmed about the seed.

In operation, the planting unit 12 will generally be utilized on a grain drill 10 for crops having narrow row width requirements. Such crops, for example, are soybeans which are often planted in rows spaced 10"–15" apart. To utilize the planting unit 12, the operator will first adjust the gauge wheel 26 to the desired setting or depth by raising the planting units 12 from the ground, removing the pin 56 from each locking means 50, shifting the stop bracket 38 to the appropriate setting and reinserting the pin 56.

As the unit 12 is then towed across the field by the tractor, the disk blades 24 slice a furrow while the gauge wheels 26 firm the furrow walls, clean the disk blades 24 and measure the furrow depth. The seed is deposited near the furrow bottom through the seed tube 64 and fertilizer is added when necessary through the fertilizer tube 66. The closing tines 28 slice a cut along each side of the furrow to collapse the soil loosely over the seed. Press wheels can be utilized when necessary to firm the soil over the seed when the pressure exerted by the press wheel will not cause crusting of the soil, as for example, in moist soil conditions.

We claim:

1. In an agricultural planter having a support frame, a pair of furrow-forming disks carried by the frame for rotation about respective axes and within upright planes so that the disks diverge upwardly and rearwardly from adjacent edges forward of their axes, a pair of depth gauge wheels carried by and supporting the frame, said wheels rotatable about axes spaced rearwardly of the disk axes, the peripheries of the wheels contacting the ground in the area where the disks leave the ground and cooperating with the disks to compact the furrow walls, a seed delivery means carried by the frame and adapted to discharge seed between the disks, the improvement comprising: a frame-carried support member disposed between the planes occupied by the disks and extending rearwardly of the wheel axes; pivot structure carried by the support member and spaced radially inwardly of the peripheries of the wheels; a pair of forwardly extending arms swingably mounted on the pivot structure, one arm projecting between each disk and its respective wheel for rotatably supporting said wheel; a bracket swingably carried by the support member in offset relation to the pivot structure, said bracket including an upwardly projecting portion; an abutment surface on the bracket offset from the pivot structure and engageable with each arm to limit swinging movement of the arm; and releasable locking means between the bracket and support member for securing the bracket against swinging movement.

2. The invention as defined in claim 1, wherein the support member further carries furrow-closing tines for engaging the ground outwardly spaced from each furrow wall.

3. In an agricultural planter having a support frame, a pair of furrow-forming disks supported by the frame for rotation about respective axes and within upright planes so that the disks diverge upwardly and rearwardly from adjacent edges forward of their axes, a pair of depth gauge wheels carried by and supporting the frame, said wheels rotatable about axes spaced rearwardly of the disk axes, the peripheries of said wheels contacting the ground in the area where the disks leave the ground and cooperating with the disks to compact the furrow walls, a seed delivery means carried by the frame and adapted to discharge the seed between the disks, the improvement comprising: a rearwardly extending support member carried by the frame and disposed between the planes occupied by the disks; pivotal means carried on the member between the wheels; a forwardly extending arm projecting between each disk and wheel, said arms rotatably supporting the wheels at their forward ends and swingably carried on the pivotal member at their rearward portions; bracket structure carried between the arms, swingably secured to the support member radially inwardly of the wheel peripheries and in offset relation to the pivot means, said bracket structure including an upwardly projecting portion; stop means carried on the bracket structure offset from the pivotal means, said stop means being engageable with the arms to limit swinging movement; and releasable locking means between the upwardly projecting portion and support member for preventing swinging movement of the bracket structure.

4. The invention as defined in claim 3 wherein the stop means is a transversely extending pin supported by the bracket structure below and rearwardly of the pivotal means.

5. In an agricultural planter having a support frame, a pair of furrow-forming disks carried by the frame for rotation about respective axes and within upright planes so that the disks diverge upwardly and rearwardly from adjacent edges forward of their axes, a pair of depth gauge wheels carried by the supporting the frame, said wheels rotatable about axes spaced rearwardly of the disk axes, the peripheries of said wheels contacting the ground in the area where the disks leave the ground and cooperating with the disks to compact the furrow walls, a seed delivery means carried by the frame and adapted to discharge the seed between the disks, an improved wheel support means disposed between the wheels comprising: a support member carried by the frame between the planes occupied by the disks, said member extending rearwardly of the wheel axes; pivot structure carried by the support member and spaced radially inwardly of the wheel peripheries; a pair of forwardly extending arms swingably mounted on the pivot structure, one arm projecting between each disk and its outwardly spaced wheel and rotatably supporting the latter; a bracket carried between the wheels and swingably secured to the support member radially inwardly of the wheel peripheries and in offset relation to the pivot structure, said bracket including an upwardly extending portion projecting radially outwardly of the wheel peripheries; an abutment surface carried by the bracket in offset relation to the pivot structure, said surface engageable with the arms to limit swinging movement; and multi-positioned locking means between the bracket portion and support member for releasably securing the bracket to the member in selected positions.

6. The invention defined in claim 5 wherein the bracket is pivotally secured to the support member and the locking means includes a plurality of transversely alignable openings through the bracket portion and support member, said openings equally radially spaced from the pivotal connection between the bracket and support member and adapted to receive a removable locking member.

7. In an agricultural planter having a support frame, a pair of furrow-forming disks carried by the frame for rotation about respective axes and within upright planes so that the disks diverge upwardly and rearwardly from adjacent edges forward of their axes, a pair of depth gauge wheels having hubs and carried by and supporting the frame, said wheels rotatable about axes spaced rearwardly of the disk axes, the peripheries of said wheels contacting the ground in the area where the disks leave the ground and cooperating with the disks to compact the furrow walls, a seed delivery means carried by the frame and adapted to discharge seed between the disks, an improved adjustable gauge wheel support means disposed between the hubs comprising: a support member carried on the frame, disposed between the upright planes occupied by the disks and extending rearwardly beyond the wheel axes; pivotal means carried on the member between the wheels and spaced radially inwardly of the wheel peripheries; a forwardly extending arm projecting between each disk and wheel, said arms rotatably supporting the wheels at their forward ends and swingably carried on the pivotal means at their rearward portion; bracket structure supported radially inwardly of the wheel peripheries and swingably secured to the support member in offset relation of the pivotal means, said bracket structure including an upwardly projecting portion extending radially outwardly of the wheel peripheries; transverse stop means carried on the bracket structure in offset relation to the pivotal means, said pivotal means engageable with the arms to limit swinging movement; and locking means between the upwardly projecting portion and support member for releasably securing the upwardly projecting portion to the support member to prevent swinging movement of the upwardly projecting portion.

8. The invention defined in claim 7 wherein each arm includes a neck portion projecting rearwardly beyond the pivotal means, the bracket structure is pivotally secured to the support member below the pivotal means and the stop means is a pin carried by the bracket structure rearwardly of and below the pivotal means.

9. In an agricultural planter having a support frame, a pair of furrow-forming disks carried by the frame for rotation about respective axes and within upright planes so that the disks diverge upwardly and rearwardly from adjacent edges forward of their axes, a pair of depth gauge wheels carried by and supporting the frame, said wheels rotatable about axes spaced rearwardly of the disk axes, the peripheries of said wheels contacting the ground in the area where the disks leave the ground and cooperating with the disks to compact the furrow walls, a seed delivery means carried by the frame and adapted to discharge the seed between the disks, an improved adjustable gauge wheel support means disposed between the wheels comprising: a support member carried by the frame between the planes occupied by the disks, said member extending rearwardly of the wheel axes; pivot structure carried by the support member and spaced radially inwardly of the wheel peripheries; a pair of forwardly extending arms swingably mounted on the pivot structure, one arm projecting between each disk and its respective wheel and rotatably supporting the respective wheel, said arms including rearwardly extending neck portions projecting beyond the pivot structure; pivot means carried by the support member between the arms and offset from the pivot structure, said pivot means spaced radially inwardly of the wheel peripheries; a bracket swingably carried on the pivot means and including a rearwardly extending portion projecting radially outwardly of the wheel peripheries; a transversely extending stop carried by the bracket rearwardly spaced from the pivot means and engageable with the neck portions of each arm to limit upwardly swinging movement of the arms; and locking means between the bracket portion and support member including a locking pin and a plurality of transversely alignable openings through said portion and member, said pin adapted to be removably inserted through said aligned openings to prevent the bracket from swinging.

10. A soil-preparing structure for a seed planter having a frame comprising: a pair of furrow-forming disks carried by the frame and diverging from closely adjacent edges in the disks' lower forward quadrant to comparatively widely separated edges in the disks' upper rear quadrant; a pair of wheels outboard of and alongside the respective disks and offset rearwardly of the disks, each wheel having axle structure substantially parallel to the axis of the respective adjacent disk, each of said wheels being composed of an outer annular rim portion extending in an axial direction outwardly from an inner edge engageable with the surface of the adjacent disk, and a rim support carried on the respective axle structure and extending radially therefrom for connection to the rim portion, said rim support being spaced outwardly from the inner edge of said rim portion to define therewith an inwardly opening cavity in said wheel, said wheel further having its rear peripheral portion rearwardly of the rear edge of the adjacent disk defining a gap between the rear edge of each disk and the internal surface of the rim portion of its adjacent wheel; a U-shaped wheel supporting arm structure including a transverse bight portion carried in the respective gaps and a pair of arms, each arm having at least its major portion disposed within the respective cavity of the respective wheel and with each being inclined from lower ends supporting the respective axle structure of the wheel and extending upwardly and rearwardly therefrom to the bight portion, said bight portion further including transverse pivot structure permitting independent vertical movement of each arm and for mounting the latter on the frame, said arm structure further having neck portions extending rearwardly relative to said transverse pivot structure; and means on the frame engageable with said neck portions for limiting vertical movement of said arms and their respective wheels.

11. A soil-preparing structure for a seed planter having a transverse frame comprising: a pair of furrow-forming disks diverging from closely adjacent edges in the disks' lower forward quadrant to comparatively widely separated edges in the disks' upper rear quadrant; a pair of wheels outboard of and alongside the respective disks and offset rearwardly of the disks, each wheel having axle structure substantially parallel to the axis of the respective adjacent disk, each of said wheels being composed of an outer annular rim portion extending in an axial direction outwardly from an inner edge engageable with the surface of the adjacent disk, and a rim support carried on the respective axle structure and extending radially therefrom for connection to the rim portion, said rim support being spaced outwardly from the inner edge of said rim portion to define an inwardly opening cavity in said wheel, each of said wheels further having its rear peripheral portion rearwardly of the rear edge of the adjacent disk defining a gap between the rear edge of each disk and the internal transverse surface of the rim portion of its adjacent wheel; a wheel and disk carrier frame extending over substantially the upper half of the disk and having an arcuate underside conforming to the shape of the disk, a depending frame portion extending from the underside to axle structures supporting the disks, and a rearward extension portion near the disks' edges at their upper rear quadrants, said rearward extension portion being disposed between the wheel rims; a U-shaped wheel supporting arm structure including a transverse bight portion carried in the respective gaps between the respective rim portions and rear edge of the disk and a pair of arms, each arm having at least its major portion disposed within the respective cavity of the respective wheel and with each being inclined from lower ends supporting the respective axle structure of the wheel and extending upwardly and rearwardly therefrom to the bight portion, said bight portion further including transverse pivot structure within the outer peripheries of said wheels permitting vertical movement of each arm relative to the carrier frame and for mounting the latter on said rearward extension portion of the carrier frame; and a drawbar member extending between the transverse frame and a portion of the carrier frame forward of the disks.

12. A soil-preparing structure for a seed planter having a frame comprising: a pair of furrow-forming disks carried by the frame and diverging from closely adjacent edges in the disks' lower forward quadrant to comparatively widely separated edges in the disks' upper rear quadrant; a pair of wheels outboard of and alongside the respective disks and offset rearwardly of the disks, each wheel having axle structure substantially parallel to the axis of the respective adjacent disk, each of said wheels being composed of an outer annular rim portion extending in an axial direction outwardly from the inner edge engageable with and generally in the place of the surface of the adjacent disk, and a rim support carried on the respective axle structure and extending radially therefrom for connection to the rim portion, said rim support being spaced outwardly from the inner edge of said rim portion to define an inwardly opening cavity in said wheel, said wheel further having its rear peripheral portion rearwardly of the rear edge of the adjacent disk defining a gap between the rear edge of each disk and the internal surface of its adjacent rim portion; wheel supporting arm structure including a pair of arms, each having at least its major portion disposed within the respective cavity of the respective wheel and with each being inclined from lower ends supporting the respective axle structure of the wheel and extending upwardly and rearwardly beyond the upper rear edges of the disks to transverse pivot structure extending between the edges of the disks within the outer peripheries of said wheels and in said gaps, the pivot structure permitting independent vertical movement of each said arm and mounting each said arm on the frame, said arm structure further having projecting portions extending rearwardly and means on the frame engageable with said projecting portions of the arm structure for limiting vertical movement of said arms and their respective wheels.

13. A soil-preparing structure for a seed planter having a frame comprising: a pair of furrow-forming disks carried by the frame and diverging from closely adjacent edges in the disks' lower forward quadrant to comparatively widely separated edges in the disks' upper rear quadrant; a pair of wheels outboard of and alongside the respective disks and offset rearwardly of the disks, each wheel having axle structure substantially parallel to the axis of the respective adjacent disk, each of said wheels being composed of an outer annular rim portion extending in an axial direction outwardly from the inner edge engageable with the surface of the adjacent disk, and a rim support carried on the respective axle structure and extending radially therefrom for connection to the rim portion, said rim support being spaced outwardly from the inner edge of said rim portion to define an inwardly opening cavity in said wheel, said wheel further having its rear peripheral portion rearwardly of the rear edge of the adjacent disk defining a gap between the rear edge of each disk and the outer annular rim portion of its adjacent wheel; an elongated fore-and-aft extending disk and wheel carrier frame extending over the disks and having a forward portion forward of the disks, a central portion above the disks with a depending portion extending between the disks and supporting the axle structure of the disks, and a rear portion above and outboard of the rear upper quadrant of the disks; a U-shaped wheel supporting arm structure including a transverse bight portion disposed rearwardly of the disks and in said gap and a pair of arms extending downwardly and forwardly with each having at least its major portion disposed within the respective cavity of the respective wheel and with each being inclined from lower ends supporting the respective axle structure of the wheel to a juncture with the bight portion, said bight portion further including transverse pivot structure carried within the outer peripheries of said wheels supporting said wheel supporting arm structure on said rear portion of the carrier frame permitting vertical movement of each arm relative to the carrier frame; and a drawbar link extending from the frame rearwardly to a rear end connected to the forward portion of the carrier frame.

14. The invention defined in claim 13 further characterized by said arm structure having rearwardly extending neck portions; and means on the frame engageable with said neck portions for limiting vertical movement of said arms and their respective wheels.

15. The invention defined in claim 13 in which the bight portion and upper portions of the arms extend through the respective gaps between the edges of the disks and the inner surfaces of said rims.

16. The invention defined in claim 13 further characterized by closure members mounted on the rear portion of the carrier frame and engaging the ground in trailing relation to the wheels for closing the furrow formed by the disks.

* * * * *

UNITED STATES PATENT OFFICE
CERTIFICATE OF CORRECTION

Patent No. 4,207,823              Dated 17 June 1980

Inventor(s) Ronald M. Steilen and Steve A. Junge

It is certified that error appears in the above-identified patent and that said Letters Patent are hereby corrected as shown below:

Column 5, line 60, delete "member" and insert -- means --;
Column 6, line 19, after "improved" insert -- adjustable --.

Signed and Sealed this

Third Day of March 1981

[SEAL]

Attest:

RENE D. TEGTMEYER

Attesting Officer          Acting Commissioner of Patents and Trademarks